US012683901B2

(12) United States Patent (10) Patent No.: US 12,683,901 B2
De Smedt et al. (45) Date of Patent: Jul. 14, 2026

(54) APPARATUSES, METHODS AND NON-TRANSITORY COMPUTER-READABLE STORAGE MEDIUMS FOR NETWORK ACCESS

(71) Applicant: Nokia Solutions and Networks Oy, Espoo (FI)

(72) Inventors: Killian De Smedt, Antwerp (BE); Kenneth Wan, Ottawa (CA); Kristian Poscic, Mountain View, CA (US); Sanjay Wadhwa, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 75 days.

(21) Appl. No.: 18/185,561

(22) Filed: Mar. 17, 2023

(65) Prior Publication Data

US 2024/0314077 A1 Sep. 19, 2024

(51) Int. Cl.
*H04L 47/24* (2022.01)
*H04L 47/80* (2022.01)

(52) U.S. Cl.
CPC .............. *H04L 47/24* (2013.01); *H04L 47/80* (2013.01)

(58) Field of Classification Search
CPC ........ H04L 47/24; H04L 47/805; H04L 47/80
See application file for complete search history.

(56) References Cited

U.S. PATENT DOCUMENTS

| | | | | |
|---|---|---|---|---|
| 10,033,589 | B1 * | 7/2018 | Batta ...................... | H04L 47/78 |
| 11,246,011 | B1 * | 2/2022 | Satyanarayana ...... | H04L 12/185 |
| 2011/0137940 | A1 * | 6/2011 | Gradin ................. | G06F 16/972 |
| | | | | 707/769 |
| 2020/0059992 | A1 * | 2/2020 | Skog ...................... | H04L 45/38 |
| 2021/0092068 | A1 * | 3/2021 | Ismailsheriff ........... | H04L 47/22 |
| 2022/0232423 | A1 * | 7/2022 | Thyagaturu ........... | H04W 28/10 |
| 2022/0256510 | A1 * | 8/2022 | Goldhamer ........... | H04W 16/14 |
| 2022/0272565 | A1 * | 8/2022 | Puente Pestaña ..... | H04M 15/00 |
| 2023/0353455 | A1 * | 11/2023 | Zhu ......................... | H04L 67/12 |

OTHER PUBLICATIONS

"Control and User Plane Separation for a disaggregated BNG" Broadband Forum, Jun. 2020, pp. 1-102.
"Broadband Policy Control Framework" Broadband Forum, Jan. 2013, pp. 1-110.

(Continued)

*Primary Examiner* — Rachel J Hackenberg

(74) *Attorney, Agent, or Firm* — Harness, Dickey & Pierce, P.L.C.

(57) ABSTRACT

A network element for network access by a subscriber in a control and user plane separation architecture includes at least one processor and at least one memory. The at least one memory stores instructions that, when executed by the at least one processor, cause the network element to establish a PFCP session to program a set of packet forwarding rules for forwarding data traffic and facilitate network access by the subscriber according to a first set of QoS parameters. The set of packet forwarding rules associate the subscriber with at least a first subscriber group. The first subscriber group includes the first set of QoS parameters that are shared between the subscriber and one or more additional subscribers.

15 Claims, 4 Drawing Sheets

(56) References Cited

OTHER PUBLICATIONS

Broadband Forum: "TR-459 Control and User Plane Separation for a disaggregated BNG", 3GPP Draft; C4-203064, 3rd Generation Partnership Project (3GPP), Mobile Competence Centre, Apr. 2020.
Broadband Forum: "TR-470 5G Wireless Wireline Convergence Architecture", 3GPP Draft; 52-2006795, 3rd Generation Partnership Project (3GPP), Mobile Competence Centre, Jul. 2020.
S. Wadhwa et al.: Architecture for Control and User Plane Separation on BNG, Jul. 2, 2018.
European Search Report Corresponding to Application No. 24153545. 9, mailed Jun. 19, 2024.
Japanese Notice of Reason for Refusal and English Translation, Corresponding to Application No. 2024-037830, mailed Feb. 4, 2025.

* cited by examiner

APPARATUSES, METHODS AND NON-TRANSITORY COMPUTER-READABLE STORAGE MEDIUMS FOR NETWORK ACCESS

TECHNICAL FIELD

One or more example embodiments relate to methods, apparatuses, and/or non-transitory computer-readable storage mediums for providing network access to residential gateways.

BACKGROUND

Third Generation Partnership Project (3GPP) 5th generation (5G) technology is a next generation of radio systems and network architecture that can deliver extreme broadband and ultra-robust, low latency connectivity. 5G technology improves a variety of telecommunication services offered to end users and helps support massive broadband that delivers gigabytes of bandwidth per second on demand for both uplink and downlink transmissions.

A 5G network may support IP services, such as IP television (IPTV) services for a residential gateway (RG), such as a $5^{th}$ Generation-RG (5G-RG) served by the 5G Core (5GC).

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

A Broadband Network Gateway (BNG) is an access point through which network subscribers connect to a core network, such as a 5G Core (5GC). Control and User Plane Separation in Broadband Network Gateway (CUPS BNG) is an example of a disaggregated BNG. CUPS BNG is defined in Broadband Forum (BBF) Technical Report TR-459.

Providing Quality of Service (QOS) per subscriber session is a function of the BNG. Traditionally, one home with multiple devices and/or multiple homes are serviced by an access node (AN) of a single BNG. This requires subscribers to share bandwidth at aggregation or congestion points such as the AN. One or more example embodiments provide mechanisms for grouping subscribers in a hierarchical manner to rate limit subscribers at different congestion points in the BNG.

In at least one example embodiment, a method of network access by a subscriber in a control and user plane separation architecture is described. The method may include establishing, at an aggregate gateway function, a packet forwarding protocol (PFCP) session to program a set of packet forwarding rules for forwarding data traffic. The set of packet forwarding rules may associate the subscriber with at least a first subscriber group. The first subscriber group may include a first set of quality of service (QOS) parameters that are shared between the subscriber and one or more additional subscribers. The method may additionally include facilitating network access by the residential gateway according to the first set of QoS parameters.

In at least one example embodiment, the first set of QoS parameters may be defined by a first quality of service enforcement rule (QER).

In at least one example embodiment, the first QER may reference a second QER to achieve hierarchical QoS.

In at least one example embodiment, the first QER may define the first set of QoS parameters for an AN of the network. The second QER may define a second set of QoS parameters for a BNG of the network.

In at least one example embodiment, the subscriber may be associated with the first subscriber group and with a second subscriber group. The second subscriber group may include the second set of QoS parameters defined by the second QER.

In at least one example embodiment, the first set of QoS parameters may include at least one of rates or schedulers.

At least one other example embodiment provides a network element for facilitating network access by a subscriber in a control and user plane separation architecture. The network element may include at least one processor and at least one memory. The at least one memory may store instructions that, when executed by the at least one processor, may cause the network element to establish, at an aggregate gateway function, a PFCP session to program a set of packet forwarding rules for forwarding data traffic. The set of packet forwarding rules may associate the subscriber with at least a first subscriber group. The first subscriber group may include a first set of QoS parameters that are shared between the subscriber and one or more additional subscribers. The instructions, when executed by the at least one processor, may further cause the network element to facilitate network access by the subscriber according to the first set of QoS parameters.

At least one other example embodiment provides a network element for facilitating network access by a subscriber in a control and user plane separation architecture. The network element may include: means for establishing a PFCP session to program a set of packet forwarding rules for forwarding data traffic. The set of packet forwarding rules may associate the subscriber with at least a first subscriber group. The first subscriber group may include a first set of QoS parameters that are shared between the subscriber and one or more additional subscribers. The network element may further includes means for facilitating network access by the subscriber according to the first set of QoS parameters.

In at least one example embodiment, the first set of QoS parameters may be defined by a first QER.

In at least one example embodiment, the first QER may reference a second QER to achieve hierarchical QoS.

In at least one example embodiment, the first QER may define the first set of QoS parameters for an AN of the network. The second QER may define a second set of QoS parameters for a BNG of the network.

In at least one example embodiment, the subscriber may be associated with the first subscriber group and with a second subscriber group. The second subscriber group may include the second set of QoS parameters defined by the second QER.

In at least one example embodiment, the first set of QoS parameters may include at least one of rates or schedulers.

Also described herein is a non-transitory computer-readable storage medium storing computer-executable instruction that, when executed by the at least one processor at a network element in a control and user plane separation architecture, may cause the network element to perform a method for network access. The method may include establishing, at an aggregate gateway function, a packet forwarding protocol (PFCP) session to program a set of packet forwarding rules for forwarding data traffic. The set of packet forwarding rules may associate the subscriber with at least a first subscriber group. The first subscriber group may include a first set of QoS parameters that are shared between the subscriber and one or more additional subscribers. The method may additionally include facilitating network access by the residential gateway according to the first set of QoS parameters.

In at least one example embodiment, the first set of QoS parameters may be defined by a first QER.

In at least one example embodiment, the first QER may define a parent QER to achieve hierarchical QoS.

In at least one example embodiment, the parent QER may define a second set of QoS parameters for a second subscriber group at a congestion point upstream of the first subscriber group.

In at least one example embodiment, the first QER may define the first set of QoS parameters for an AN of the network. The parent QER may define a second set of QoS parameters for a BNG of the network.

In at least one example embodiment, the subscriber may be associated with the first subscriber group and with a second subscriber group. The second subscriber group may include the second set of QoS parameters defined by the parent QER.

In at least one example embodiment, the first set of QoS parameters may include at least one of rates or schedulers.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
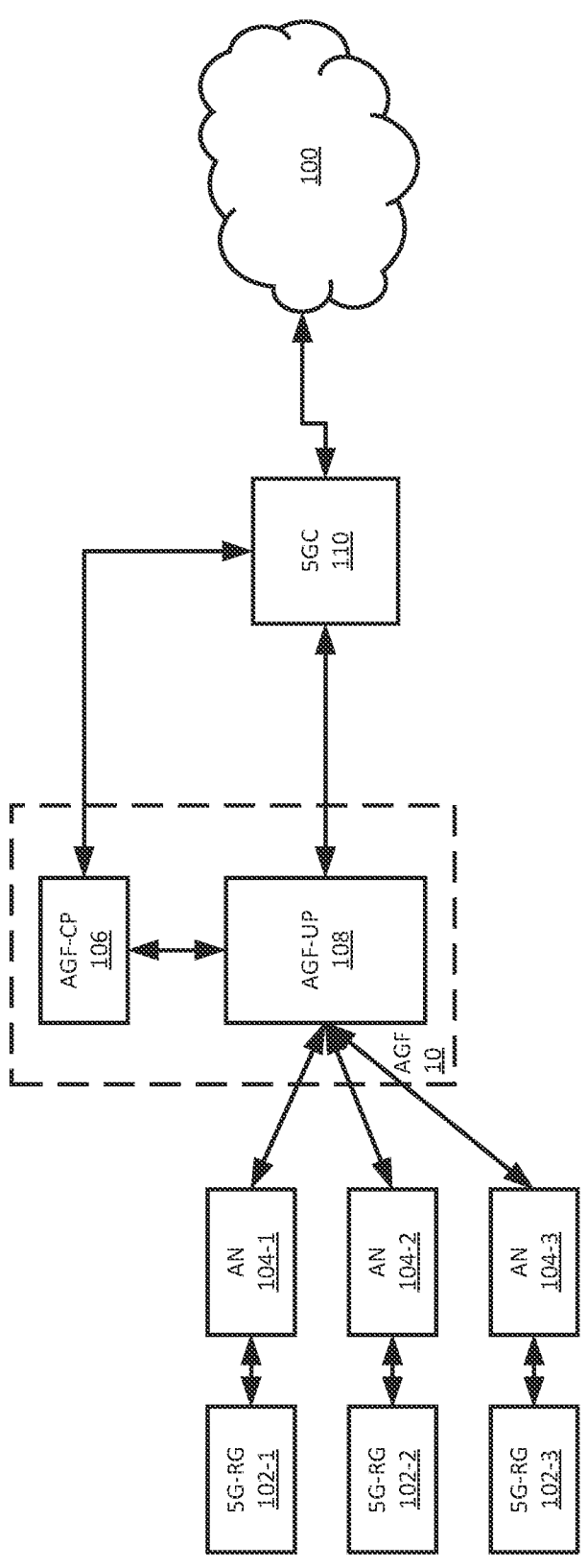
FIG. 1 is a block diagram illustrating a portion of a system architecture for wireless core network access, according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node, Aggregate Gateway Function (AGF) node, residential gateway (RG), server, etc., it should be understood that one or more example embodiments discussed herein may be performed by one or more processors (or processing circuitry) at the applicable device, apparatus, network node, network element, or system. For example, according to one or more example embodiments, at least one memory may store instructions that, when executed by one or more processors, cause the network element/network node, or the like, to perform the operations discussed herein.

As discussed herein, the term "mechanism," in addition to its plain and ordinary meaning, may refer to methods, apparatuses and/or non-transitory computer readable storage mediums where applicable.

As discussed herein, the terminology "one or more" and "at least one" may be used interchangeably.

It will be appreciated that a number of example embodiments may be used in combination.

As discussed herein, the term "subscriber" refers to the purchaser or subscriber of broadband services, and which utilizes a residential gateway (RG) to access the services. The term "user" refers to users of an end user device or customer premises equipment (CPE) that send and receive user traffic through the RG. Although used in this way for the sake of clarity, a user may also be referred to as a subscriber.

As discussed herein, a packet data unit (PDU) session refers to an IP based PDU session. An IP based PDU session (sometimes referred to as an IP session) refers to an IP connection established between a RG (e.g., a 5$^{th}$ Generation-Residential Gateway (5G-RG)) and a wireless core network, such as a 5GC, where the wireless core network assigns the RG one or more IP addresses to use for transmission and reception of traffic (e.g., data and control traffic). In operation, a RG utilizes the assigned IP address(es) or IP prefix(es) to connect to the Internet (or other data network). In at least some instances, a RG may obtain several different IP addresses/prefixes for each type of service, wherein each represents a different IP Session. IP based PDU sessions include a single IPv4 session, a single IPv6 session or a single dual stack IP session. Although discussed herein with regard to IP sessions for example purposes, example embodiments should not be limited to these examples. Rather, example embodiments may be applicable to other PDU session types.

In a Control and User Plane Separation in Broadband Network Gateway (CUPS BNG) architecture, the PFCP protocol is used to program traffic forwarding rules from the control plane or control plane function (e.g., Aggregate Gateway Function-Control Plane (AGF-CP)) to the user plane or user plane function (e.g., AGF-User Plane (AGF-UP)) and vice-versa. Each set of traffic forwarding rules that can be used for one or more PDU sessions from a single RG is referred to as a PFCP session.

Generally, the control plane is responsible for maintaining session states and providing instructions to the user plane.

The user plane is responsible for moving packets through the system from ingress to egress by following the traffic rules programmed by the control plane, and independently interacting with other nodes in the network through various routing protocols (e.g., Ethernet Virtual Private Network (EVPN), Border Gateway Protocol (BGP), Interior Gateway Protocol (IGP), etc.).

In the context of wireline access to the 5GC, 5G-RGs may be served by the 5GC. A 5G-RG acts as a full 3GPP User Equipment (UE) that is assumed to terminate 3GPP Non-access stratum (NAS) signaling and to support User Equipment Route Selection Policy (URSP) rules sent by the 5GC to the UE.

The PFCP protocol programs the forwarding rules on a per subscriber basis including the queue or policer rate per traffic or forwarding class. In most broadband use cases, an Internet Service Provider (ISP) (or service provider) offers a limited set of service offerings (or services) based on bandwidth. Therefore, subscribers often share a same QoS template (including a programmed set of QoS parameters) when paying for the same service, rather than the control plane programming the user plane with individual QoS parameters for each subscriber. QoS parameters may be provisioned statically or dynamically. Static provisioning of QoS parameters involves the use of static QoS templates, whereas dynamic provisioning involves programming of QoS parameters and the like in real time.

One or more example embodiments provide mechanisms to enable grouping of a number of subscribers together to share QoS resources and facilitate network access. A subscriber may belong to one or more subscriber groups (SGRPs) to allow hierarchical QoS.

FIG. 1 is a block diagram illustrating a portion of a system architecture for wireless core network access by a 5G-RG, according to example embodiments. In the example shown in FIG. 1, the system architecture incorporates a CUPS BNG architecture.

Referring to FIG. 1, the communications network includes a plurality of 5G-RGs 102-1, 102-2, 102-3, a plurality of Access Networks (ANs) 104-1, 104-2, 104-3 (also referred to as Access Nodes or AN nodes), an Aggregate Gateway Function (AGF) node 10, a wireless core network 110 and a Data Network (DN), such as the Internet 100. In this example, the wireless core network 110 is a 5GC and each of the 5G-RGs 102-1, 102-2, 102-3 is served by a corresponding one of the ANs 104-1, 104-2, 104-3. However, example embodiments should not be limited to this example.

Each of the ANs 104-1, 104-2, 104-3 may include one or more of a Next Generation Radio Access Network (NG-RAN) or a Wireline 5G Access Network (W-5GAN).

Each of the 5G-RGs 102-1, 102-2 and 102-3 may provide IP services to one or more end user devices or customer premises equipment (CPE) (not shown in FIG. 1). In one example, an end user device or CPE is understood to be a hardware device or equipment typically located at the home or business of a customer. Example end user devices may include terminals or electronic devices such as mobile phones, laptops, computers, tablets, wireless (e.g., WiFi) access points, wireless network (e.g., WiFi) extenders, fixed wireless access units, Small Cell devices, or the like.

Although only a certain number of 5G-RGs and ANs are shown in FIG. 1, example embodiments should not be limited to this example. Rather, any number of 5G-RGs may be served by a given AN and/or any number of ANs may be served by an AGF.

For example purposes, one or more example embodiments will be discussed in more detail below with regard to the 5G-RG 102-1 and the AN 104-1. However, it should be understood that the 5G-RGs 102-2 and 102-3 may have the same or substantially the same functionality as the 5G-RG 102-1. Similarly, it should be understood that the ANs 104-2 and 104-3 may have the same or substantially the same functionality as the AN 104-1.

The 5G-RG 102-1 is a RG that connects one or more end user devices or CPE to the Internet (or other data network) 100 through the 5GC 110. The 5G-RG 102-1 registers and authenticates with the 5GC 110 through the use of standard mobile 3GPP procedures. The 5G-RG 102-1 processes control messages (e.g., 3GPP NAS messages) from the 5GC 110 and access stratum (AS) messages from the AGF 10.

Once authenticated with the 5GC 110, the 5G-RG 102-1 may be assigned one or more IP addresses upon request. The 5G-RG 102-1 may either utilize the assigned IP address as the Network Address Translation (NAT) public address (e.g., for IPV4) or assign the prefixes directly to the end user devices (e.g., for IPV6).

The 5G-RG 102-1 may support multiple services, such as IPTV. In some embodiments, IPTV can be defined as multimedia services, such as television, video, audio, textual media, graphics, data, combinations thereof, and/or the like that are delivered over IP-based networks supporting the required level of QoS, Quality of Experience (QoE), security, interactivity, reliability, or the like.

The 5G-RG 102-1 is connected to the 5GC 110 via the AN 104-1 and a gateway (or gateway function) referred to as the AGF 10. The AGF 10 is a function added to a wireline access network (e.g., the W-5GAN) that enables and/or allows connectivity to the 5GC 110 via wireline networks.

The AGF 10 is disaggregated to separate the control plane (AGF-Control Plane (AGF-CP) 106) and the user plane (AGF-User Plane (AGF-UP) 108).

Among other functionality, as discussed similarly above, the AGF-CP 106 programs the AGF-UP 108 with forwarding rules and QoS parameters via the PFCP protocol to facilitate network access by the 5G-RG 102-1 to the 5GC 110. Additional functionality of the elements of FIG. 1 will be discussed below with regard to FIG. 2.

Figure 2:
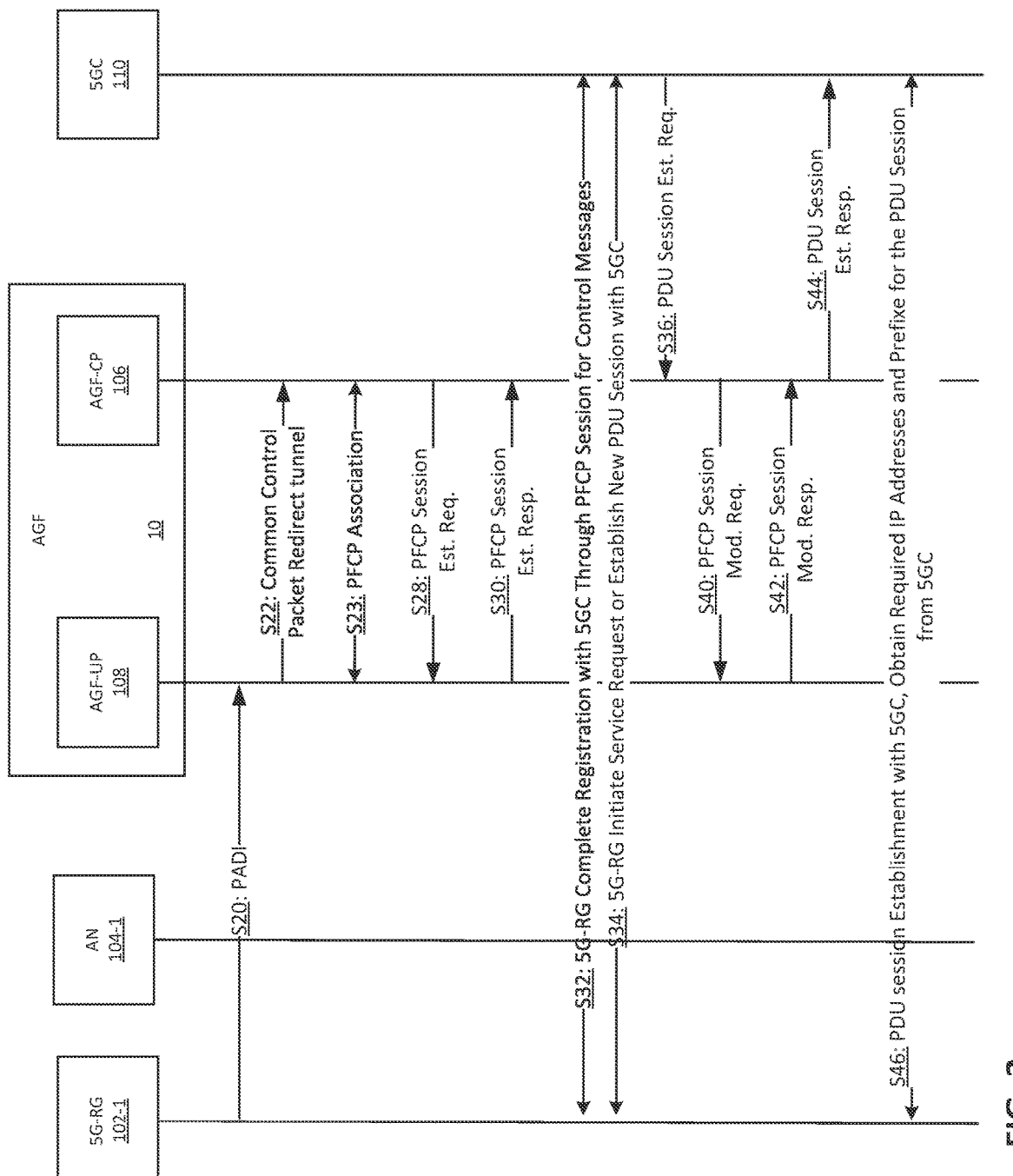
FIG. 2 is a signal flow diagram illustrating a method according to example embodiments.

FIG. 2 is a signal flow diagram illustrating a method for network access, according to example embodiments. For example purposes, the example embodiment shown in FIG. 2 will be discussed with regard to the architecture shown in FIG. 1. It should be understood, however, that example embodiments should not be limited to this example.

Referring to FIG. 2, at S20 the AGF-UP 108 receives an initiation (e.g., PADI) message from the 5G-RG 102-1 through the AN 104-1, requesting network access (e.g., to the Internet 100) via the 5GC 110. Upon receipt, at S22 the AGF-UP 108 forwards the initiation message to the AGF-CP 106 via a common control packet redirect tunnel between the AGF-UP 108 and the AGF-CP 106.

At S23, the AGF-CP 106 and the AGF-UP 108 establish an active PFCP association by exchanging PFCP association setup messages. For example, the AGF-CP 106 sends a PFCP Association Setup Request message to the AGF-UP 108, and the AGF-UP 108 responds by sending a PFCP Association Setup Response message to the AGF-CP 106. Among other things, during PFCP Association setup at S23, the AGF-CP 106 utilizes the PFCP protocol to program one or more QoS templates at the AGF-UP 108 with QoS policy names, QoS Enforcement Rules (QERs) and associated lists of QoS parameters. In one example, a service provider may design a QoS template for each of the services offered to the 5G-RG 102-1. Each QoS template has a "name" (QoS policy name) and a list of QERs, each including defined and/or pre-determined QoS parameters such as rates and schedulers (e.g., Peak Information Rate (PIR), Committed Information Rate (CIR), Priority (Prio), or the like). In this case, the QoS policy name is associated with a list of QERs, each of which includes QoS parameters assigned to a service by the service provider. If an update to the QoS template at the AGF-UP 108 is needed (e.g., addition, deletion and/or modification of a QoS template), the AGF-CP 106 may send a PFCP association update to the AGF-UP 108 to affect the update to the programmed QoS templates. Accordingly, PFCP association messages may be used to program QoS templates and/or update QoS templates on a per service level and/or across subscribers associated with a QoS template or service.

In more detail, according to at least one example embodiment, a QoS template may include a list of QoS parameters expressed as QERs. In at least one example embodiment, indexing is used for the QoS parameters such that a QER index references another QER index which may allow hierarchical QoS. Although discussed herein with regard to QER, it should be understood that one or more example embodiments may be applied to any QoS Information Element (IE) represented by one or more indices.

Figure 3:
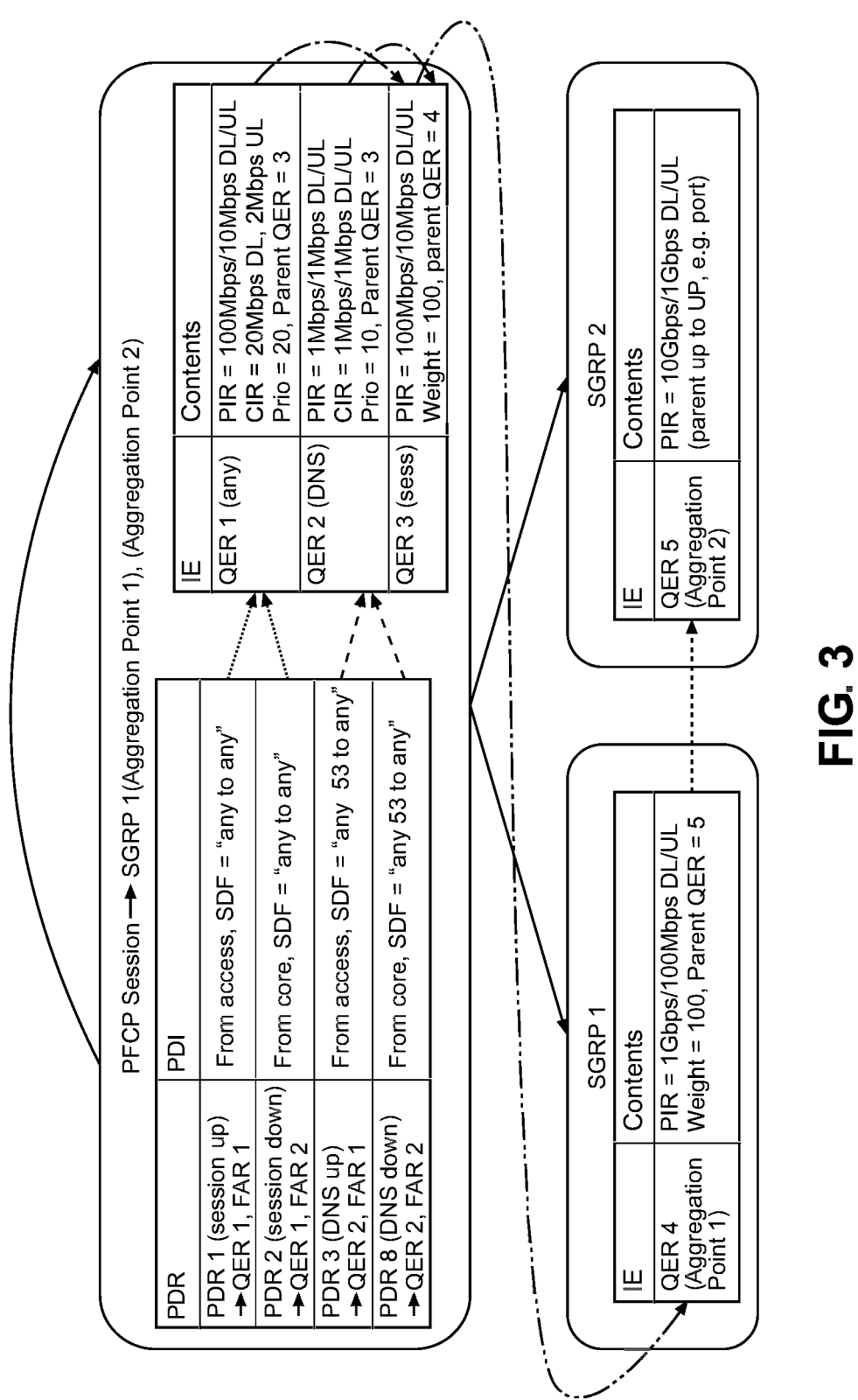
FIG. 3 illustrates a Quality of Service (QoS) template according to example embodiments.

FIG. 3 illustrates a QoS template according to example embodiments.

Referring to FIG. 3, the QoS template Subscriber Group (SGRP) 1, 2 includes a list of the QER indices (QOS rule indices), each of which is associated with a respective set or list of QoS parameters (e.g., PIR, CIR, Prio). The QER indices (e.g., QER 1, QER 2, QER 3, QER 4, QER 5) and QoS parameters are expressed as Information Elements (IEs). More specifically, a first subscriber group SGRP 1 may be associated with the QER 4 and a second subscriber group SGRP 2 may be associated with the QER 5.

A PFCP session may include a list of Packet Detection Rules (PDRs) and associated Packet Detection Information (PDI), wherein each PDR references a QER index (e.g., QER 1, QER 2) and a Forwarding Action Rule (FAR 1, FAR 2). A PDR identifies the particular forwarding rule, and the PDI is a grouped IE specifying the matching criteria using the source interface and the traffic endpoint. A FAR specifies the forwarding action and destination for the redirected control packet. As described above, the QER index is associated with a list of QoS parameters.

During the programming of a QoS template at the AGF-UP 108, the AGF-CP 106 has knowledge of the QER index for each QoS template. Consequently, during a PDU session, the AGF-CP 106 may update one or more QoS parameters by referring to a respective QER index. This may reduce the number of instructions that need to be sent to update a QoS parameter and may allow all subscriber sessions that reference a particular QER index to be indirectly updated. For example, only one instruction to modify the QER index needs to be sent which will then be referenced by one or more subscriber sessions which will then have access to the updated QoS parameters. FIG. 3 will be discussed in more detail later.

Returning to FIGS. 2, at S28 and S30, the AGF 10 establishes a PFCP session including indexing of QoS parameters and a set of forwarding rules for control messages between the 5G-RG 102-1 and the 5GC 110. In at least one example embodiment, the AGF 10 establishes the PFCP session to associate a subscriber with at least a first subscriber group and to allow for exchange of control signaling (or control messages) between the AGF-UP 108 and the AGF-CP 106. The control messages may be PPPoE control plane messages and/or NAS messages transported over PPP Vendor Specific Network Protocol (VSNP). Additionally, the AGF 10 establishes the PFCP session to program a set of packet forwarding rules for forwarding data traffic between the AGF-UP 108 and the AGF-CP 106.

In more detail, for example, once having established the PFCP session at the AGF-CP 106, at S28 the AGF-CP 106 outputs a PFCP session establishment request message (PFCP Session Est. Req.) to the AGF-UP 108. Based on the PFCP session establishment request message, the AGF-UP 108 establishes the PFCP session at the AGF-UP 108. The AGF-UP 108 then outputs a PFCP session establishment response message (PFCP Session Est. Resp.) to the AGF-CP 106 at S30, indicating that the PFCP session has been established at the AGF-UP 108. Because PFCP session establishment messages for control signaling are generally known, further discussion is omitted.

At S32, the 5G-RG 102-1 completes registration with the 5GC 110 by exchanging control messages (e.g., NAS messages or PPPoE control plane messages) according to the established PFCP session (forwarding rules). During this process, the service provider identifies the 5G-RG 102-1 through its Subscriber Identity Module (SIM) card and provides the AGF-CP 106 with initial RG Level Wireline Access Characteristics (RG-LWAC). The RG-LWAC is a QoS parameter associated with a subscriber or subscription. The RG-LWAC may convey real time 5G QoS identifier (5QI) to traffic class (TC) mapping and other aggregate QoS information, such as downlink (DL) aggregate rate, aggregate policed uplink (UL) and DL, 5QI to TC mapping for DL, wherein each TC has a queue profile and policy profile. In at least one example embodiment, the RG-LWAC may include a QoS policy name corresponding to the QoS template that the 5G-RG 102-1 should use for the requested service at the 5G-RG 102-1. The RG-LWAC information includes the QoS policy name that the 5G-RG 102-1 should use for all PDU sessions.

At S34, the 5G-RG 102-1 initiates a service request or establishes a new PDU session with the 5GC 110. As is generally known, a service request may be used in the case where the 5G-RG 102-1 needs and/or wants to re-establish the control (e.g., NAS) signaling and PDU session. In this case, the 5G-RG 102-1 is still registered with the 5GC 110, but may have temporarily lost connection with the AGF 10 (e.g., when a line is cut). If, however, the initiation message is requesting initial network access by the 5G-RG 102-1 to the 5GC 110, then at S34 the 5G-RG 102-1 may establish a new (initial) PDU session with the 5GC 110. Because service request and PDU session establishment methods such as this are generally known, a detailed discussion is omitted.

After completing the registration process at S34 and upon receipt of a PDU session establishment request from the 5GC 110 at S36, at S40 and S42, the AGF 10 modifies the established PFCP session to add a set of data forwarding rules. In so doing, the AGF 10 also specifies and/or updates the QoS parameters for the PDU session to be established. In more detail, for example, the AGF-CP 106 and the AGF-UP 108 exchange PFCP session modification messages for the requested PDU session to add a set of forwarding rules for data traffic and specify the QoS parameters to be used for the requested PDU session. In one example (e.g., using a static template), the QoS parameters may be specified by providing a QoS policy name to the AGF-UP 108 for the PDU session to be established (e.g., QER 1: template-1). The AGF-CP 106 may also include a QoS policy and QERs, which include specific QoS parameters, that may override the QERs within the QoS policy. In the dynamic case, the AGF-CP 106 may specify individual QoS parameters (e.g., QER 1: CIR 10 PIR 20, QER 2: CIR 20 PIR 40, etc.) for the PDU session to be established. The AGF-UP 108 may update entries in the QoS template based on this information from the AGF-CP 106.

In still more detail, once having modified the PFCP session as needed to add the necessary set of forwarding rules and specify QoS parameters at the AGF-CP 106 (e.g., via a QoS template or by individual QoS parameters), at S40 the AGF-CP 106 sends a PFCP session modification request message (PFCP Session Mod. Req.) specifying, among other things, the QoS parameters (e.g., via QoS policy name or via individual QoS parameters) to the AGF-UP 108. Based on the PFCP modification request message, the AGF-UP 108 modifies the PFCP session as needed to add the necessary set of data forwarding rules and specify the QoS parameters for the PDU session at the AGF-UP 108. The AGF-UP 108 then sends a PFCP session modification response message (PFCP Session Mod. Resp.) to the AGF-CP 106 at S42, indicating that the PFCP session has been modified at the AGF-UP 108. Because PFCP modification messages and methods for modifying PFCP sessions are otherwise generally known, further discussion is omitted.

At S44, once the PFCP session has been modified, the AGF-CP 106 outputs a PDU session establishment response message (PDU Session Est. Resp.) to the 5GC 110.

At S46, the 5G-RG 102-1 completes establishment of the requested PDU session with the 5GC 110 and obtains the required IP address(es) and prefix(es) for the PDU session from the 5GC 110.

Once the PDU session between the 5G-RG 102-1 and the 5GC 110 has been established, the AGF 10 facilitates access to the 5GC 110 by the 5G-RG 102-1 according to the PFCP session and QoS parameters at the AGF-CP 106 and the AGF-UP 108.

Referring back to FIG. 3, in one or more example embodiments, the packet forwarding rules programmed by the PFCP may associate a subscriber with a first subscriber group SGRP 1. In some embodiments, the subscriber may additionally be associated with a second subscriber group SGRP 2. The first subscriber group SGRP 1 may be associated with a first set of QoS parameters and the second subscriber group SGRP 2 may be associated with a second set of QoS parameters. The first subscriber group SGRP 1 may include a first QER index QER 4 as an IE that includes the first set of QoS parameters and the second subscriber group SGRP 2 may include a second QER index QER 5 as an IE that includes the second set of QoS parameters.

In an example embodiment, QER 4 may reference QER 5 to achieve hierarchical QoS. Hierarchical QoS may be achieved by a QER defining a parent QER which may be a QER of a different level, such as a congestion point or an aggregation point of the network upstream of the subscriber group, of the network architecture. For example, subscribers may be grouped at different levels of the network architecture. QER 3 may be defined for an RG such as a home that may include one or more devices. QER 3 may reference QER 4 such that QER 4 is a parent QER to QER 3. QER 4 may be defined for an AN that may service one or more RGs. QER 4 may reference QER 5 such that QER 5 is a parent QER to QER 4 and a grandparent QER to QER 3. QER 5 may be defined for a BNG that may service one or more ANs. Hierarchical QoS is defined in Broadband Forum (BBF) Technical Report TR-134.

In one or more example embodiments, the AGF 10 may modify the established PFCP session by modifying one or more of the QoS parameters as described above with PFCP association setup messages and/or PFCP session modification request messages. In at least one example embodiment, hierarchical QoS may be utilized to modify a QoS parameter. For example, if a QER is updated, any QER that references the updated or modified QER may be indirectly updated or modified. For example, if one or more QoS parameters of QER 5 is modified, then QER 4 may be indirectly updated or modified via QER 4 referencing QER 5 because QER 5 is a parent QER of QER 4.

In at least one example embodiment, the AGF 10 facilitates access to the 5GC 110 by the 5G-RG 102-1 for a subscriber according to the PFCP session and QoS parameters such as either the first set of QoS parameters and/or the second set of QoS parameters.

One or more example embodiments also provide a mechanism to selectively group subscribers into subscriber groups (SGRPs). When subscribers are grouped into SGRPs, the subscribers may share QoS resources associated with the SGRPs. In one or more example embodiments, a first subscriber and a second subscriber may be grouped into a SGRP if the two subscribers have the same QoS profile. If a first subscriber and a second subscriber have the same rates and/or schedulers defined as QoS parameters of their subscriber session, they may have the same QoS profile and may be able to be grouped together. For example, a first subscriber and a second subscriber may be grouped into the first subscriber group SGRP 1 based on the first subscriber's QoS profile matching the second subscriber's QoS profile. The AGF 10 may facilitate access to the 5GC 110 by the 5G-RG 102-1 for a first subscriber as described above. The first subscriber may be associated with the first subscriber group SGRP 1, which may reference the second subscriber group SGRP 2. Similarly, the AGF 10 may facilitate access to the 5GC 110 by the 5G-RG 102-1 for a second subscriber as described above. The second subscriber may similarly be associated with the first subscriber group SGRP 1 and the second subscriber group SGRP 2. Thus, the first subscriber and the second subscriber may be grouped into the first subscriber group SGRP 1 and may also be grouped into the second subscriber group SGRP 2.

Subscribers grouped into a subscriber group may share the QoS resources defined for that subscriber group. For example, the first subscriber and the second subscriber may share the QoS resources of the first subscriber group SGRP 1 and the second subscriber group SGRP 2 when they are grouped into the first subscriber group SGRP 1 and the second subscriber group SGRP 2. When subscribers are grouped into a subscriber session, they may share QoS resources such as the PIR defined for that particular subscriber group. For example, when the first subscriber and the second subscriber are grouped into the first subscriber group SGRP 1, they may share the PIR of 1 Gbps/100 Mbps DL/UL that is defined for the first subscriber group SGRP 1, wherein the first subscriber and the second subscriber are each allocated a portion of the PIR or other QoS resource. Similarly, when the first subscriber and the second subscriber are grouped in to the second subscriber group SGRP 2, they may share the PIR of 10 Gbps/1 Gbps DL/UL that is defined for the second subscriber group, wherein the first subscriber and the second subscriber are each allocated a portion of the PIR or other QoS resource.

In some example embodiments, more than two subscribers may be associated with each subscriber group. Each of the subscribers associated with a subscriber group may share the QoS resources such as rates and/or schedulers defined for the subscriber group. Grouping subscribers that share the same rate for a subscriber session may provide improved network access for all subscribers within a subscriber group. Traditionally, subscribers of a BNG that have a common QER correlation ID share bandwidth at aggregation or congestion points such as an access node of the network. This framework does not take into account the rates and/or schedulers of each subscriber and provides restrictive network access. The embodiments described herein provide improved network access by grouping of subscribers into subscriber groups with a common QoS profile. This grouping ensures that subscribers are able to share QoS resources that are common amongst subscribers. This grouping of subscribers allows subscribers to access the network with the rates and schedulers that they pay for and ensures that their network access is not restricted by subscribers at an aggregation point with non-common QoS resources.

Figure 4:
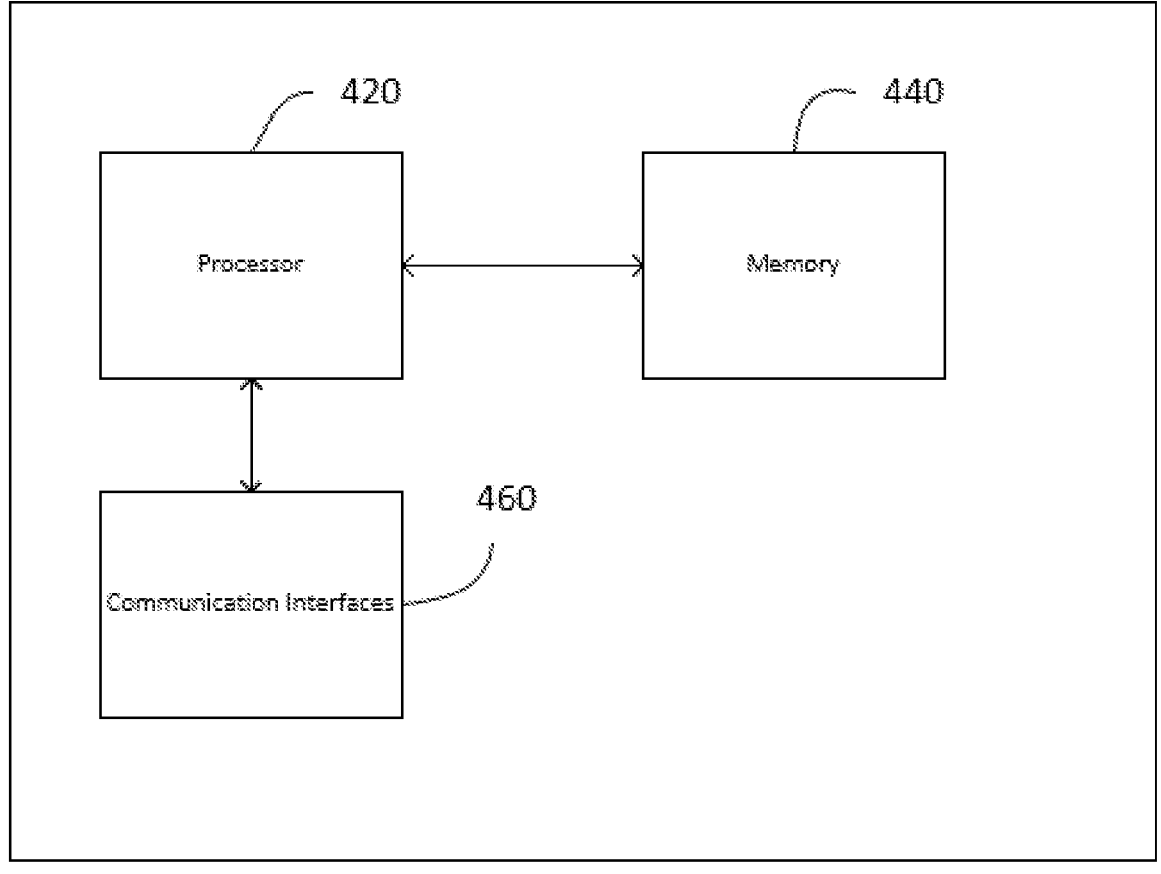
FIG. 4 illustrates an example embodiment of a network node at which an Aggregate Gateway Function (AGF) may be implemented.

FIG. 4 illustrates an example embodiment of a network node at which an AGF may be implemented. The structure shown in FIG. 4 may also be representative of other network elements, such as residential gateways, CPEs, etc.

As shown, the network node includes: a memory 440; a processor 420 connected to the memory 440; various communication interfaces 460 connected to the processor 420. The various interfaces 460 may constitute a transceiver for transmitting/receiving data from/to other network elements (e.g., network nodes, routers, nodes, servers, BNGs, etc.). As will be appreciated, depending on the implementation of the network node, the network node may include many more components than those shown in FIG. 4. However, it is not necessary that all of these generally conventional components be shown in order to disclose the illustrative example embodiment. For example purposes, the example embodiment shown in FIG. 4 will be discussed with regard to a processor 420. However, it should be understood that the network node shown in FIG. 4 may include one or more processors or other processing circuitry, such as one or more Application Specific Integrated Circuits (ASICs).

The memory 440 may be a computer readable storage medium that generally includes a random access memory (RAM), read only memory (ROM), and/or a permanent mass storage device, such as a disk drive. The memory 440 also stores an operating system and any other routines/modules/applications for providing the functionalities of the network node (including UPF, CPF, MPF, etc.) to be executed by the processor 420. These software components may also be loaded from a separate computer readable storage medium into the memory 440 using a drive mechanism (not shown). Such separate computer readable storage medium may include a disc, tape, DVD/CD-ROM drive, memory card, or other like computer readable storage medium (not shown). In some example embodiments, software components may be loaded into the memory 440 via one of the various interfaces 460, rather than via a computer readable storage medium.

The processor 420 or other processing circuitry may be configured to carry out instructions of a computer program by performing the arithmetical, logical, and input/output operations of the system. Instructions may be provided to the processor 420 by the memory 440.

The various communication interfaces 460 may be wired and may include components that interface the processor 420 with the other input/output components. As will be understood, the various interfaces 460 and programs stored in the memory 440 to set forth the special purpose functionalities of the network node will vary depending on the implementation of the network node.

The interfaces 460 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, BNGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, BNGs, servers, ANs, CPEs, routers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for network access by a subscriber in a control and user plane separation architecture, the method comprising:

establishing, at an aggregate gateway function, a packet forwarding control protocol (PFCP) session to program a set of packet forwarding rules for forwarding data traffic, wherein the set of packet forwarding rules associates the subscriber with at least a first subscriber group, the subscriber and at least one additional subscriber being associated with the first subscriber group and the first subscriber group including a first set of quality of service (QOS) parameters that are shared between the subscriber and the at least one additional subscriber; and facilitating network access by the subscriber according to the first set of QoS parameters, wherein the first set of QoS parameters are defined by a first quality of service enforcement rule (QER), the first QER references a parent QER to achieve hierarchical QoS, and the parent QER is defined for a congestion point upstream of the first subscriber group and defines a second set of QoS parameters for a second subscriber group at the congestion point.

2. The method of claim 1, wherein modifying the parent QER modifies the first QER.

3. The method of claim 1, wherein the first QER defines the first set of QoS parameters for an access node (AN) of a network and the parent QER defines the second set of QoS parameters for a broadband network gateway (BNG) of the network.

4. The method of claim 3, wherein the subscriber is associated with the first subscriber group and with the second subscriber group that includes the second set of QoS parameters defined by the parent QER.

5. The method of claim 1, wherein the first set of QoS parameters includes at least one of rates or schedulers.

6. A network element for network access by a subscriber in a control and user plane separation architecture, the network element comprising:

at least one processor; and at least one memory storing instructions that, when executed by the at least one processor, cause the network element to:

establish a packet forwarding control protocol (PFCP) session to program a set of packet forwarding rules for forwarding data traffic, wherein the set of packet forwarding rules associates the subscriber with at least a first subscriber group, the subscriber and at least one additional subscriber being associated with the first subscriber group and the first subscriber group including a first set of quality of service (QOS) parameters that are shared between the subscriber and the at least one additional subscriber; and facilitate network access by the subscriber according to the first set of QoS parameters, wherein the first set of QoS parameters are defined by a first quality of service enforcement rule (QER), the first QER references a parent QER to achieve hierarchical QoS, and the parent QER is defined for a congestion point upstream of the first subscriber group and defines a second set of QoS parameters for a second subscriber group at the congestion point.

7. The network element of claim 6, wherein modifying the parent QER modifies the first QER.

8. The network element of claim 6, wherein the first QER defines the first set of QoS parameters for an access node (AN) of a network and the parent QER defines the second set of QoS parameters for a broadband network gateway (BNG) of the network.

9. The network element of claim 8, wherein the subscriber is associated with the first subscriber group and with the second subscriber group that include the second set of QoS parameters defined by the parent QER.

10. The network element of claim 6, wherein the first set of QoS parameters include at least one of rates or schedulers.

11. A non-transitory computer-readable storage medium storing computer-executable instructions that, when executed by at least one processor at a network element in a control and user plane separation architecture, cause the network element to perform a method of network access by a subscriber, the method comprising:

establishing, at an aggregate gateway function, a packet forwarding control protocol (PFCP) session to program a set of packet forwarding rules for forwarding data traffic, wherein the set of packet forwarding rules associates the subscriber with at least a first subscriber group, the subscriber and at least one additional subscriber being associated with the first subscriber group and the first subscriber group including a first set of quality of service (QOS) parameters that are shared between the subscriber and the at least one additional subscriber; and facilitating network access by the subscriber according to the first set of QoS parameters, wherein the first set of QoS parameters are defined by a first quality of service enforcement rule (QER), the first QER references a parent QER to achieve hierarchical QoS, and the parent QER is defined for a congestion point upstream of the first subscriber group and defines a second set of QoS parameters for a second subscriber group at the congestion point.

12. The non-transitory computer-readable storage medium of claim 11, wherein modifying the parent QER modifies the first QER.

13. The non-transitory computer-readable storage medium of claim 11, wherein the first QER defines the first set of QoS parameters for an access node (AN) of a network and the parent QER defines the second set of QoS parameters for a broadband network gateway (BNG) of the network.

14. The non-transitory computer-readable storage medium of claim 13, wherein the subscriber is associated with the first subscriber group and with the second subscriber group that include the second set of QoS parameters defined by the parent QER.

15. The non-transitory computer-readable storage medium of claim 11, wherein the first set of QoS parameters include at least one of rates or schedulers.

\* \* \* \* \*